US010845888B2

(12) United States Patent
Grossman et al.

(10) Patent No.: US 10,845,888 B2
(45) Date of Patent: Nov. 24, 2020

(54) TECHNIQUES FOR INTEGRATING DIFFERENT FORMS OF INPUT WITH DIFFERENT FORMS OF OUTPUT WHEN INTERACTING WITH AN APPLICATION

(71) Applicant: AUTODESK, Inc, San Rafael, CA (US)

(72) Inventors: Tovi Grossman, Toronto (CA); George Fitzmaurice, Toronto (CA); Natalia Bogdan, Toronto (CA)

(73) Assignee: AUTODESK, INC., San Rafael, CA (US)

(*) Notice: Subject to any disclaimer, the term of this patent is extended or adjusted under 35 U.S.C. 154(b) by 74 days.

(21) Appl. No.: 14/621,339

(22) Filed: Feb. 12, 2015

(65) Prior Publication Data
US 2015/0245005 A1 Aug. 27, 2015

Related U.S. Application Data

(60) Provisional application No. 61/939,656, filed on Feb. 13, 2014.

(51) Int. Cl.
G06F 3/02 (2006.01)
H04N 13/332 (2018.01)
(Continued)

(52) U.S. Cl.
CPC ......... G06F 3/0227 (2013.01); H04N 13/275 (2018.05); H04N 13/332 (2018.05); H04N 13/359 (2018.05); H04N 13/398 (2018.05)

(58) Field of Classification Search
None
See application file for complete search history.

(56) References Cited

U.S. PATENT DOCUMENTS

2004/0100445 A1* 5/2004 Kim ................... G06F 3/018
345/169
2005/0275942 A1* 12/2005 Hartkop ............ H04N 13/0409
359/464

(Continued)

OTHER PUBLICATIONS

Nvidia ("3D Vision Hot Keys" published as of Jan. 9, 2009 at http://nvidia.custhelp.com/app/answers/detail/a_id/2315/~/3d-vision-hot-keys).*

(Continued)

Primary Examiner — William A Beutel
(74) Attorney, Agent, or Firm — Artegis Law Group, LLP

(57) ABSTRACT

In one embodiment of the present invention, a hybrid software application transitions between stereoscopic imaging and non-stereoscopic imaging to optimize user interactions with a three-dimensional model of a three-dimensional object. Based on user input, the hybrid software application selects an operational mode as either stereoscopic mode or non-stereoscopic mode. The hybrid software application then performs then operations on the three-dimensional model. If the operational mode is the stereoscopic mode, then the hybrid software application generates two, offset images of the three-dimensional object—an image for the right eye and a separate image for the left eye. By contrast, if the operational mode is the non-stereoscopic mode, then the hybrid software application generates a single image of the three-dimensional object that is shared by both eyes. Advantageously, by sagaciously transitioning between stereoscopic imaging and non-stereoscopic imaging, the user viewing experience may be tailored to optimize user productivity for each operation.

19 Claims, 4 Drawing Sheets

(51) Int. Cl.
H04N 13/359 (2018.01)
H04N 13/275 (2018.01)
H04N 13/398 (2018.01)

(56) References Cited

U.S. PATENT DOCUMENTS

| | | | | |
|---|---|---|---|---|
| 2010/0060570 | A1* | 3/2010 | Underkoffler | G06F 3/017 345/156 |
| 2011/0107270 | A1* | 5/2011 | Wang | G06F 19/3437 715/850 |
| 2011/0122235 | A1* | 5/2011 | Lee | H04N 13/0452 348/51 |
| 2011/0148786 | A1* | 6/2011 | Day | G06F 3/04883 345/173 |
| 2011/0225611 | A1* | 9/2011 | Shintani | H04N 13/0438 725/39 |
| 2011/0254844 | A1* | 10/2011 | Hatakeda | H04N 13/0022 345/426 |
| 2011/0304707 | A1* | 12/2011 | Oyagi | G02B 27/225 348/51 |
| 2012/0050501 | A1* | 3/2012 | Narita | G06F 3/011 348/51 |
| 2012/0133645 | A1* | 5/2012 | Jung | H04N 13/0022 345/419 |
| 2012/0229450 | A1* | 9/2012 | Kim | G06F 3/04815 345/419 |
| 2014/0071119 | A1* | 3/2014 | Piemonte | G06T 19/003 345/419 |
| 2014/0143733 | A1* | 5/2014 | Jung | G06F 3/04815 715/848 |
| 2015/0082181 | A1* | 3/2015 | Ames | G06F 3/04815 715/738 |
| 2015/0325038 | A1* | 11/2015 | Baker | H04N 13/0007 345/426 |

OTHER PUBLICATIONS

Agarawala, A. and Balakrishnan, R. (2006). Keepin' it real: pushing the desktop metaphor with physics, piles and the pen. ACM CHI, 1283-1292.
Balakrishnan, R., Baudel, T., Kurtenbach, G., and Fitzmaurice, G. (1997). The Rockin'Mouse: integral 3D manipulation on a plane. ACM CHI, 311-318.
Benko, H., and Feiner, S. (2007). Balloon selection: A multi-finger technique for accurate low-fatigue 3d selection. IEEE 3DUI. 79-86.
Boritz. J., (1999) The Effectiveness of Three-Dimensional Interaction. PhD thesis, UBC, Canada.
Bowman, D. A., and Hodges, L. F., (2005) Exploring individual differences in raybased selection; strategies and traits, VR, 163-170.
Conner, B. D., Snibbe, S. S., Herndon, K. P., Robbins, D. C., Zeleznik, R. C., and van Dam, A. (1993) Three-dimensional widgets. ACM SI3D, 183-188.
Cornsweet, T. N. The Staircase-Method in Psychophysics. Am. J. Psych., 75(3), 485-491.
De Araújo, B. R., Casiez, G., Jorge, J. A., & Hachet, M. (2013). Mockup Builder: 3D modeling on and above the surface. Computers & Graphics.
Forsberg, A. S., LaViola Jr, J. J., & Zeleznik, R. C. (1998). ErgoDesk: a framework for two-and three-dimensional interaction at the ActiveDesk. Immersive Projection Technology Workshop.
Froehlich, B., Hochstrate, J., Skuk, V., and Huckauf, A. (2006). The GlobeFish and the GlobeMouse: two new six degree of freedom in-put devices for graphics applications. ACM CHI, 191-199.
Grossman, T., Balakrishnan, R., Kurtenbach, G., Fitzmaurice, G., Khan, A., and Buxton, B. (2002) Creating principal 3D curves with digital tape drawing. ACM CHI, 121-128.
Grossman, T., Wigdor, D., and Balakrishnan, R. (2004) Multi-finger gestural interaction with 3d volumetric displays. ACM UIST, 61-70.
Grossman, T., and Balakrishnan, R. (2004). Pointing at trivariate targets in 3D environments. ACM CHI, 447-454.
Hachet, M., Bossavit, B., Cohé, A., Rivière, J.B. (2011). Toucheo: Multitouch and Stereo Combined in a Seamless Workspace. ACM UIST, 587-592.
Hilliges, O., Kim, D., Izadi, S., Weiss, M., Wilson, A. (2012) Ho-loDesk: direct 3d interactions with a situated see-through display, ACM CHI, 2421-2430.
Hinckley, K., Pausch, R., Goble, J., and Kassell, N. (1994). A survey of design issues in spatial input. ACM UIST, 213-222.
Knoedel, S., & Hachet, M. (Mar. 2011). Multi-touch RST in 2D and 3D spaces: Studying the impact of directness on user perfor-mance. IEEE 3DUI, 75-78.
Lee, J., Olwal, A., Ishii, H., and Boulanger, C. (2013). SpaceTop: Integrating 2D and Spatial 3D Interaction in See-through Desktop Environment. ACM CHI, 189-192.
Leroy, L., Fuchs, P., and Moreau, G. ( 2012). Real-time adaptive blur for reducing eye strain in stereoscopic displays. ACM Trans. Appl. Percept. 9( 2), 18 pages.
Levitt, H. (1971), Transformed up-down methods in psychoacoustics. J. Acoust. Soc. Am., 49(2), 467-477.
Marquardt, N., Jota, R., Greenberg, S., & Jorge, J. A. (2011). The continuous interaction space: interaction techniques unifying touch and gesture on and above a digital surface. Interact (461-476).
R. Teather, W. Stuerzlinger, (2011). Pointing at 3D Targets in a Stereo Head-Tracked Virtual Environment, IEEE 3DUI, 87-94.
Robertson, G., Czerwinski, M., Larson, K., Robbins, D., Thiel, D., and Dantzich, M. (1998). Data mountain: using spatial memory for document management. ACM UIST, 153-162.
Sollenberger, R. and Milgram, P. (1993). Effects of stereoscopic and rotational displays in a three-dimensional path-tracing task. Human Factors, 35(3). 483-499.
Song, P, Wooi Boon Goh, William Hutama, Chi-Wing Fu, and Xiaopei Liu. (2012). A handle bar metaphor for virtual object ma-nipulation with mid-air interaction. ACM CHI, 1297-1306.
Suryakumar, R. and Bobier, W. R. Gain and Movement Time of Convergence-Accommodation in Preschool Children. Optom. Vis. Sci., 81(11), 835-843.
Valkov, D., Giesler, A., Hinrichs, K. H. (2012) Evaluation of Depth Perception for Touch Interaction with Stereoscopic Rendered Objects, ACM ITS, 21-30.
Wang, G., McGuffin, M. J., Bérard, F., and Cooperstock, J. R. (2011) Pop-up depth views for improving 3D target acquisition, GI, 41-48.
Wang, R. Y., Paris, S., Popovic, J., (2011) 6D hands: markerless hand-tracking for computer aided design. ACM UIST, 549-558.
Ware, C. (1995). Dynamic stereo displays. ACM CHI. 310-316.
Ware, C. and Franck, G. (1996). Evaluating stereo and motion cues for visualizing information nets in three dimensions. ACM Trans. on Graphics, 15(2). p. 121-140.
Ware, C. and Lowther, K. (1997) Selection using a one-eyed cursor in a fish tank VR environment, ACM TOCHI, 309-322.
Ware, C., Arthur, K., and Booth, K. (1993). Fish tank virtual reality. ACM CHI, 37-42.
Wilson, A. (2006). Robust computer vision-based detection of pinching for one and two-handed gesture input. ACM UIST, 255-258.
Zhai, S. Human performance in six degree of freedom input control. University of Toronto, 1995.
Leap Motion, "Reach into new worlds", 2013, found at: https://www.leapmotion.com, 6 pages.

* cited by examiner

TECHNIQUES FOR INTEGRATING DIFFERENT FORMS OF INPUT WITH DIFFERENT FORMS OF OUTPUT WHEN INTERACTING WITH AN APPLICATION

CROSS-REFERENCE TO RELATED APPLICATIONS

This application claims benefit of the U.S. Provisional Patent Application having Ser. No. 61/939,656 and filed on Feb. 13, 2014. The subject matter of this related application is hereby incorporated herein by reference.

BACKGROUND OF THE INVENTION

Field of the Invention

Embodiments of the present invention relate generally to computer science and, more specifically, to techniques for integrating different forms of input with different forms of output when interacting with an application.

Description of the Related Art

Modeling software enables both non-professional users (i.e., hobbyists) and professional users, such as artists, architects, and engineers, to efficiently create and manipulate three-dimensional (3D) objects. Typically, 3D modeling software provides 3D widgets to support content manipulation of data received via two-dimensional (2D) input devices, and provides non-stereoscopic imaging that creates the illusion of 3D depth from a single 2D image.

Increasingly, to streamline and expedite the creation and optimization of 3D objects, various modeling tools support free-hand spatial input in lieu of the traditional 2D user interface. The 3D control and "natural" interactions of free-hand spatial input (e.g., allowing users' hands to directly manipulate 3D objects) improves the user experience and productivity for many tasks. However, for other tasks, such as selecting objects and inputting textual data, 2D input techniques via mouse and keyboard are oftentimes more effective than 3D manipulation. Further, extended use of 3D input devices can be fatiguing for users.

Similarly, to increase the realism of displayed images, some 3D modeling tools use two offset 2D images to create the illusion of 3D depth in a technique known as stereoscopic imaging. Notably, stereoscopic images can improve depth perception and scene recognition, thereby easing certain design tasks. However, stereoscopic display devices give rise to a discrepancy known as "vergence accommodation conflict," where the depth focus of the eyes, which is fixed at the display plane, is inconsistent with the perceived depth of the object being viewed. This discrepancy may cause eye strain and, with extended use, dizziness and/or nausea for users.

In general, each of 2D input techniques, 3D input techniques, non-stereoscopic imaging, and stereoscopic imaging has advantages and disadvantages depending on the current task being performed by the user. Often, users select input and output interfaces and, consequently, corresponding devices and supporting 3D modeling tools that optimize what are thought to be "typical" tasks. Unfortunately, such compromises often reduce the productivity of users while performing non-typical tasks. Further, if the types of routine tasks change, then the original choice of input and/or output techniques may no longer optimize typical design efforts.

As the foregoing illustrates, what is needed in the art are more effective techniques to integrate different forms of input with different forms of output when interacting with software applications.

SUMMARY OF THE INVENTION

One embodiment of the present invention sets forth a computer-implemented method for interacting with a software application. The method includes performing a first operation on first input data to determine that a current operational mode is a stereoscopic mode; in response, generating first left eye image data and first right eye image data that represent a three-dimensional model; performing a second operation on second input data to determine that a next operational mode is a non-stereoscopic mode; and in response, generating first shared eye image data that represents the three-dimensional model.

One advantage of the disclosed approach is that optimizing input and output interfaces for a given task significantly increases user productivity without needlessly fatiguing the user. In particular, these techniques provide both manual and automatic triggers to switch modes and provide a non-disruptive user-experience. Because these techniques facilitate tuning input and output interfaces per task and per user, user design efforts are not subjected to compromises that often impact user productivity in applications that rely on conventional, less integrated, input and output techniques.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
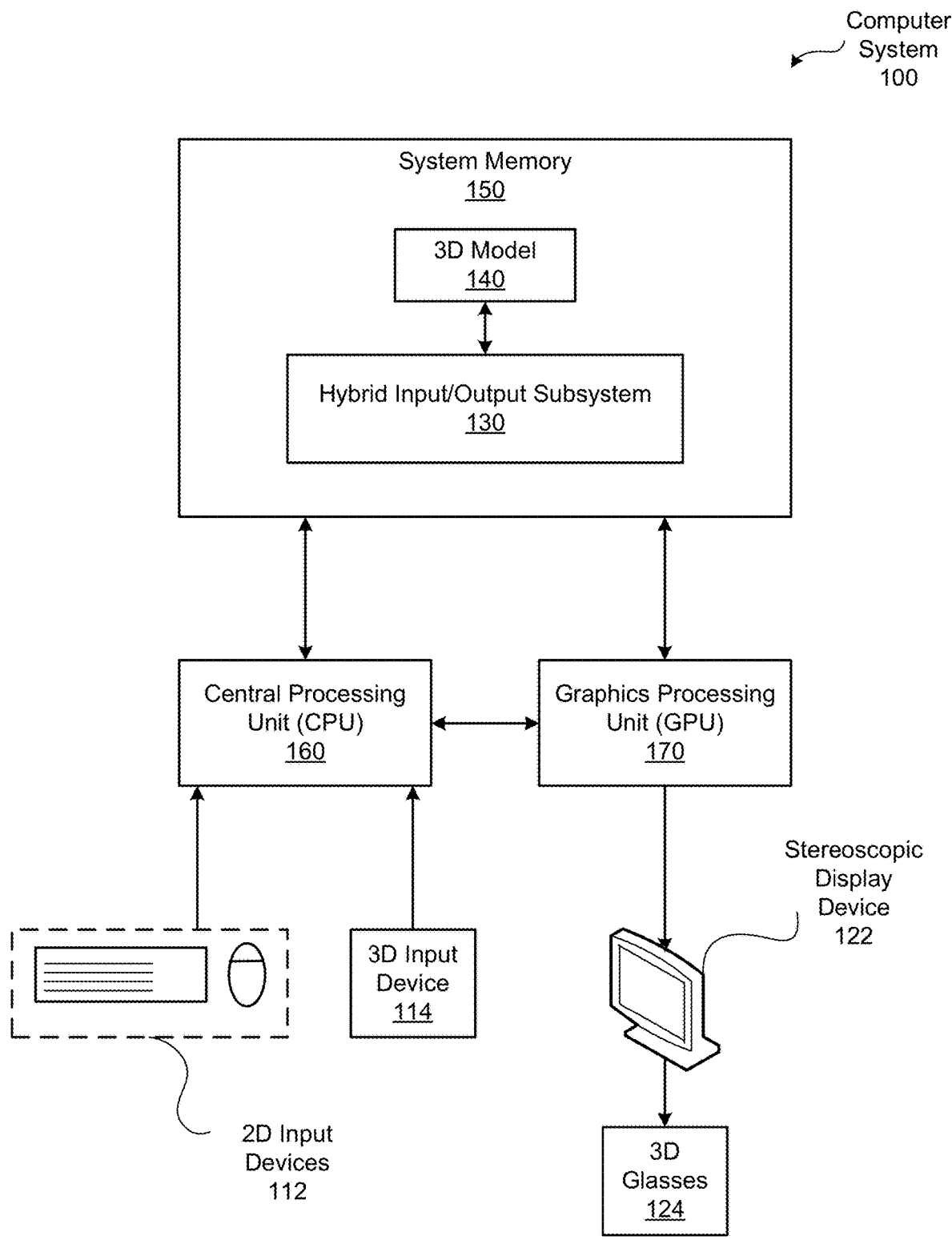
FIG. 1 is a block diagram illustrating a computer system configured to implement one or more aspects of the present invention.

FIG. 1 is a block diagram illustrating a computer system 100 configured to implement one or more aspects of the present invention. As shown, the computer system 100 includes, without limitation, a central processing unit (CPU) 160, a system memory 150, a graphics processing unit (GPU) 170, two-dimensional (2D) input devices 112, a three-dimensional (3D) input device 114, a stereoscopic display device 122, and 3D glasses 124.

The CPU 160 is capable of receiving input user information from the 2D input devices 112, such as a keyboard and a mouse. The CPU 160 is also capable of receiving user input information from the 3D input device 114, such as hand tracking systems that convey the 3D positions of two markers placed on the user's thumb and index finger to enable free-hand spatial input. In alternate embodiments, any number and type of 2D input devices 112 and 3D input devices 114 may be included in the computer system 100.

In operation, the CPU 160 is the master processor of the computer system 100, controlling and coordinating operations of other system components. In particular, the CPU 160 issues commands that control the operation of the GPU 170. The GPU 170 incorporates circuitry optimized for graphics and video processing, including, for example, video output circuitry. The GPU 170 delivers pixels to the stereoscopic display device 122 that may be any conventional device that is capable of processing separate, offset visual images—one for the left eye and one for the right eye—designed to convey a perception of 3D depth. In a stereoscopic mode, 3D glasses 124 ensue that each of the images is delivered to the corresponding eye.

In some embodiments, the stereoscopic display device 122 and the 3D glasses 124 implement "passive stereoscopic 3D." In passive stereoscopic 3D, the stereoscopic display device 122 and the 3D glasses 124 use polarization techniques to separate the left eye images and right eye images. In alternate embodiments, the GPU 170 delivers a synchronization signal and the stereoscopic display device 122 and the 3D glasses 124 implement "active stereoscopic 3D." The 3D glasses 124 in active stereoscopic 3D implementation alternatively present the left eye images and the right eye images. In yet other embodiments, the stereoscopic display device 122 implements "autostereoscopic 3D" techniques that provide the illusion of 3D depth without the 3D glasses 124. In such embodiments, the 3D glasses 125 are omitted from the computer system 100. In general, the computer system 100 may include any combination of output devices that compatibly support stereoscopic viewing.

Notably, the stereoscopic display device 122 included in the computer system 100 also supports non-stereoscopic imaging. In non-stereoscopic imaging, The GPU 170 delivers pixels as single images to be processed by both the left and right eyes. In some embodiments, the 3D glasses 124 may coordinate with the stereoscopic display device 122 to provide non-stereoscopic imaging. In other embodiments, the user may elect to remove the 3D glasses 124 when the GPU 170 is generating non-stereoscopic image data. Regardless of the technology implemented for the stereoscopic display device 122 and the 3D glasses 124, the computer system 100 supports both stereoscopic and non-stereoscopic viewing.

The system memory 150 stores content, such as software applications and data, for use by the CPU 160 and the GPU 170. During execution, each software application typically supports either the 2D input devices 112 or the 3D input device 114, and transmits either stereoscopic or non-stereoscopic output to the stereoscopic display device 122. For example, a text editing application may support a keyboard and a mouse and transmit 2D textual data as a single set of images intended to be viewed with both eyes to the stereoscopic display device 122.

Many applications support 2D input devices 112 and non-stereoscopic imaging, but not 3D input devices 114 and stereoscopic imaging. However, some tasks may be performed more efficiently using 3D control via 3D input devices 114 and the depth cues provided by stereoscopic imaging. For example, 3D input devices 114 and stereoscopic imaging enable users to more accurately position 3D models 140 of 3D objects in 3D space than 3D input devices 112 and non-stereoscopic imaging.

Conversely, using 3D input devices 114 and stereoscopic imaging to position the 3D model 140 in 2D space typically does not provide an improved user experience compared to using 2D input devices 112 and non-stereoscopic imaging. Notably, relying on 3D spatial interactions can become fatiguing for users and may be less efficient for tasks such as 2D manipulation. Further, viewing stereoscopic content for extended periods of time often causes eye strain and eye fatigue for users. In general, each of the "input modes" (i.e., 3D input and 2D input) and each of the "output modes" (i.e., stereoscopic viewing and non-stereoscopic viewing) has advantages and disadvantages, and the optimum input and output modes vary based on the current task.

For this reason, the system memory 150 includes a hybrid input/output subsystem 130. More specifically, the hybrid input/output subsystem 130 is a modelling environment that combines the benefits of 3D input, 2D input, stereoscopic viewing, and non-stereoscopic viewing within a single coherent interface. In operation, the hybrid input/output subsystem 130 smoothly transitions the input interactions with the 3D model 140 between the 3D input device 114 and the 2D input devices 112. Similarly, the hybrid input/output subsystem 130 alternates between transmitting either stereoscopic or non-stereoscopic data to the GPU 170 and the stereoscopic display device 122 for display purposes.

To optimize the user experience, the hybrid input/output subsystem 130 implements a variety of manual and automatic triggers designed to select the optimum input and output modes for each task. For example, in some embodiments, the hybrid input/output subsystem 130 enables the user to trigger transitions between stereoscopic or non-stereoscopic viewing based on keyboard shortcuts. In other embodiments, the hybrid input/output subsystem 130 enables the user to trigger transitions between based on the position (flipped up or down) of the 3D glasses 124.

The hybrid input/output subsystem 130 is also configured to automatically transition between input and output paradigms based on input device triggers. For example, if the hybrid input/output subsystem 130 detects that the user hand position is more than a predetermined threshold height above the surface off a desk, then the hybrid input/output subsystem 130 enables user interaction with the 3D model 140 via the 3D input device 114 instead of the 2D input devices 112.

In some embodiments, the hybrid input/output subsystem 130 determines the optimal input and output modes based on the current operation. Suppose that the hybrid input/output subsystem 130 were receiving input data via the 2D input devices 112 and generating non-stereoscopic images. Subsequently, if the hybrid input/output systems 130 were to detect a scene rotation operation, then the hybrid input/output subsystem 130 would transition to receiving input data via the 3D input device 114 and generating stereoscopic images.

In alternate embodiments, the hybrid input/output subsystem 130 may implement any number of manual triggers, automatic device triggers, and automatic operation triggers in any combination. In some embodiments, the transition triggers are configurable to enable each user to efficiently tailor the input and output modes to optimize the efficiency of each task.

Optimizing User Interactions with 3D Models

Figure 2:
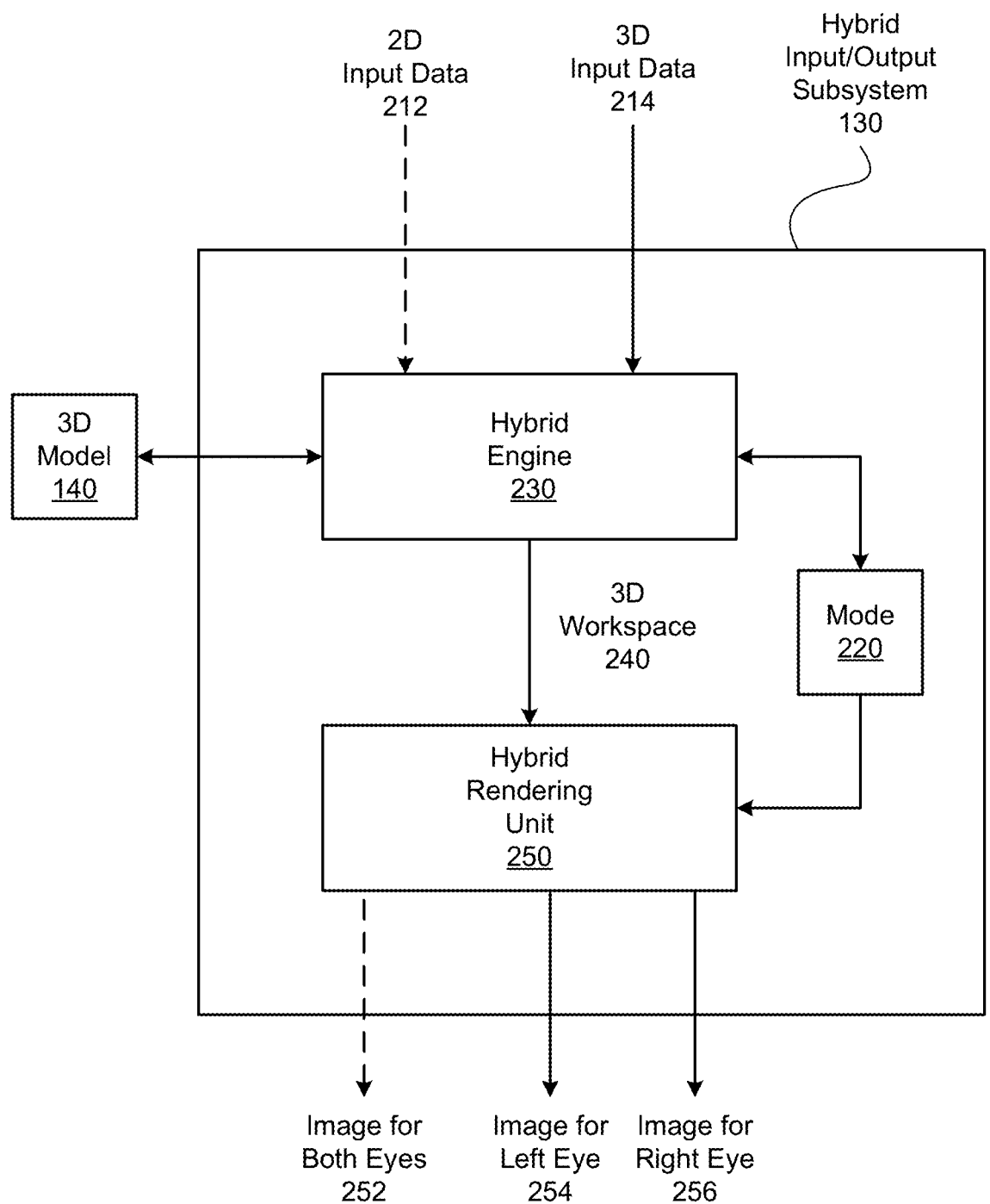
FIG. 2 is a block diagram illustrating the hybrid input/output subsystem of FIG. 1, according to one embodiment of the present invention.

FIG. 2 is a block diagram illustrating the hybrid input/output subsystem 130 of FIG. 1, according to one embodiment of the present invention. As shown, the hybrid input/output subsystem 130 includes, without limitation, a hybrid engine 230, a mode 220, and a hybrid rendering unit 250.

In operation, the hybrid engine 230 selects and sets the mode 220 to optimize user interactions, both input and output, with the 3D model 140 while providing coherent transitions between input and output modes. For explanatory purposes, the input data and the output data for the hybrid engine 230 are shown for two different modes 220: "2D" (depicted with dotted lines) and "3D" (depicted with solid lines). If the mode 220 is 2D, then the hybrid engine 230 operates on the 3D model 140 based on 2D input data 212 that is transmitted from the 2D input devices 112. If the mode 220 is 3D, then the hybrid engine 230 operates on the 3D model 140 based on 3D input data 214 that is transmitted from the 3D input device 114.

As the hybrid engine 230 performs operations on the 3D model 140, the hybrid engine 230 transmits a 3D workspace 240 that visually represents the 3D model 140 to the hybrid rendering unit 240 for processing and transmission to the stereoscopic display device 122. Although the hybrid engine 230 enables different device interfaces to the 3D model 140, the hybrid engine 230 maintains the data included in the 3D model 140 in a consistent fashion regardless of the mode 220. For example, if the user modifies the 3D model 140 while the mode 220 is 2D and, subsequently, manually triggers the hybrid engine 230 to transition the mode 220 to 3D, then the 3D model 140 remains modified.

Upon receiving the 3D workspace 240, the rendering unit 240 performs rendering operations that are based on the mode 220. If the mode 220 is 2D, then the rendering unit 240 generates an image for both eyes 252. By contrast, if the mode 220 is 3D, then the rendering unit 240 generates both an image for left eye 254 and an image for right eye 256. The rendering unit 240 may generate the image for both eyes 252, the image for left eye 254, and the image for right eye 256 in any technically feasible fashion.

In one implementation, to generate the image for left eye 254 and the image for right eye 256, the rendering unit 240 renders geometries specified in the 3D workspace 240 twice. More specifically, the rendering unit 240 applies stereo projection techniques to render the image for left eye 254 based on one camera location and to render the image for right eye 256 based on another camera location. Typically, the rendering unit 240 offsets the two camera locations by a predetermined value that is approximately the distance between the left and right eyes of users. In alternate implementations, the user may select the separation between the left and right eyes (i.e., the offset). By contrast, to generate the image for both eyes 252, the rendering unit 240 renders geometries specified in the 3D workspace 240 once, applying perspective projection techniques to render the image for both eyes 252 based on a single camera location.

In general, the rendering unit 240 may perform any graphics techniques as known in the art for generating the image for both eyes 252, the image for left eye 254, and the image for right eye 256. In alternate embodiments, the image for both eyes 252, the image for left eye 254, and/or the image for right eye 256 may be supplemented and/or replaced with any number and/or type of signals that are consistent with the stereoscopic display device 122. For instance, in embodiments that implement "active stereoscopic 3D," the rendering unit 240 may generate a synchronization signal that causes the stereoscopic display device 122 to temporally alternate between the image for left eye 254 and the image for right eye 254.

The hybrid input/output subsystem 130 is configured to continuously repeat this input-processing-output cycle, enabling the designer to dynamically interact with the 3D model 140 based on real-time images on the stereoscopic display device 122. Advantageously, the hybrid input/output subsystem 130 exploits advantages of the mode 220, minimizes disadvantages of the mode 220, and ensures user-friendly transitions into and out of the mode 220.

For example, if the mode 220 is 2D, then the hybrid rendering unit 250 is configured to superimpose 2D user-interface elements, such as a 2D menu bar and cursor, over the 3D workspace 240. These 2D user-interface elements are designed to improve the efficiency of interacting using the 2D input devices 112 while viewing the 3D model 240 in a non-stereoscopic manner. However, discrepancies in depth cues may occur when such 2D user-interface elements occlude 3D geometries that are perceived in front of the screen of the stereoscopic display device 122. Such apparent position inconsistences, known as the parallax problem, not only increase the probability of visual misinterpretation, but can also cause visual discomfort. Consequently, if the mode 220 is 3D, then the hybrid rendering unit 250 does not superimpose 2D user-interface elements over the 3D workspace 240.

Visual discomfort, as well as undesirable disruptions in the user viewing experience, may also arise from an immediate cut from a non-stereoscopic scene to a stereoscopic scene. For this reason, when the mode 220 changes, the hybrid rendering unit 250 is configured to perform a transition sequence that allows the eyes to gradually adjust to the new convergence angle. The hybrid rendering unit 250 may generate the transition sequence in any technically feasible fashion.

In some embodiments, when the hybrid engine 230 changes the mode 220 from 2D to 3D, the hybrid rendering unit 250 initially renders the 3D workspace 240 with no separation between the left eye and the right eye images and superimposes opaque 2D user-interface elements. During a transition period, the hybrid rendering unit 250 gradually increases the offset between the left eye and the right eye images and decreases the opacity of the 2D user-interface elements. Advantageously, such a transition sequence (incrementally increasing visual depth cues while decreasing the visibility of 2D user-interface elements) minimizes visual disruptions and discomfort. To complete the transition, the hybrid rendering unit 250 renders the 3D workspace 240 with the entire predetermined offset between the left eye and the right eye images without superimposing the 2D user-interface elements.

Transition Triggers

The hybrid engine 230 controls the mode 220 and unobtrusively orchestrates transitions between the modes 220 to optimize the interactive environment (both input mode and viewing mode). To select the mode 220, the hybrid engine 230 implements a variety of transition triggers that automatically tune the mode 220 to reflect the current tasks. Further, the hybrid engine 230 enables manual transition triggers that override the automatic transition triggers, allowing users to customize the environment in real-time.

The automatic transition triggers include, without limitation, automatic input device triggers and automatic operation triggers. The hybrid input/output subsystem 130 may implement any number and type of triggers in any technically feasible fashion. In one embodiment, automatic transitions triggered by the input device include the following:

Freehand movement triggers: The hybrid engine 230 detects freehand motion based on sensory input, such as hand position and motion, conveyed to the hybrid engine 230 from the 3D input device 114. If the mode 220 is 2D and the hand is in motion at a position more than a predetermined height threshold (e.g., 15 centimeters) above the keyboard area, then the hybrid engine 230 transitions the mode 220 to 3D. If the mode 220 is 3D and the hand drops beneath the predetermined height threshold while not "pinched" for a predetermined length of time (such as 3.5 seconds), then the hybrid engine 230 transitions the mode 220 to 2D.

Mouse movement: As disclosed previously herein, if the mode 220 is 2D, then the hybrid rendering unit 250 displays 2D user-interface elements to facilitate tasks that are more easily accomplished in 2D. By contrast, if the mode 220 is 3D, then the hybrid rendering unit 250 does not display 2D user-interface elements, thereby avoiding the parallax problem. To optimize access to the 2D user-interface elements, if the mode 220 is 3D and the hybrid engine 230 detects movement of one or more predetermined 2D input devices 112, such as a mouse or a trackball, then the hybrid engine 330 transitions the mode 220 to 2D. Subsequently, if the hybrid engine 230 detects that the 2D input devices 112 become stationary while the 3D input device 114 is active (i.e., a hand moves above the height threshold), the then hybrid engine 230 transitions the mode 220 to 3D.

Spring loaded mouse clicks: To enable seamless transitions in a continuous manner between the modes 220, the hybrid engine 230 is configured to quickly transition the mode 220 based on the specific combinations of input data from both the 2D input devices 112 and the 3D input devices 114. For example, suppose that while the hand is in mid-air above the keyboard, the hybrid engine 230 detects mouse movement and, in response, transitions the mode 220 to 2D. In such a scenario, if an object or 2D user-interface elements are subsequently selected then the hybrid engine 230 transitions the mode 220 to 3D. By orchestrating this sequence of transitions, the hybrid engine allow the user to rapidly select an object in 2D with the mouse and then position the selected object in 3D with freehand movement. In alternate embodiments, any number of predetermined sequences may be established to leverage the strengths of the hybrid input and output capabilities of the hybrid input/output subsystem 130.

The hybrid engine 230 is further configured to automatically transition the mode 220 when the current operation matches a predetermined operation trigger. In one embodiment, operation triggers include the following:

Rotation trigger: Upon detecting a scene rotation operation that is initiated while the mode 220 is 2D, the hybrid engine 230 transitions the mode 220 to 3D. Such a transition provides a stereoscopic view of the scene and is designed to provide additional, useful information during the scene rotation. After the scene rotation operation finishes, the hybrid engine 230 transitions the mode 220 to 2D.

Translation trigger: If the hybrid engine 230 detects an object translation into or out of the screen (e.g., a trajectory within 30 degrees of the view plane normal vector) while the mode 220 is 2D, then the hybrid engine 230 transitions the mode 220 to 3D. After the translation operation finishes, the hybrid engine 230 transitions the mode 220 to 2D. Notably, positioning an object in 3D typically benefits from stereoscopic viewing, but positioning an object in 2D space does not typically benefit from stereoscopic viewing. Consequently, by tailoring the mode 220 during object translations, the hybrid engine 230 provides the benefits of stereoscopic viewing while minimizing any unnecessary discomfort related to extended stereoscopic viewing.

The hybrid engine 230 also supports any number of explicit, manual triggers that enable per-user customization of input and output modes. Advantageously, the hybrid engine 230 overrides automatic triggers based on manual triggers, allowing extended viewing in a single mode. In one embodiment, the hybrid engine 230 enables the following:

Keyboard shortcut trigger: A specific keyboard shortcut (such as an F1 key) toggles the mode 220 between 2D and 3D.

Flip-up stereo glasses: In some embodiments, the 3D glasses 124 are configured to transmit the orientation of moveable lenses to the hybrid engine 230. If the hybrid engine 230 detects that the orientation of the moveable lenses crosses a transition threshold, then the hybrid engine 230 changes the mode 220. For example, if the user "flips" the lenses from up to down, then the hybrid engine 230 change the mode 220 from 2D to 3D.

Regardless of the mode 220, the hybrid rendering unit 250 generates the image for both eyes 252, the image for left eye 254, and the image for right eye 256 based on a consistent set of visual data—the 3D workspace 240. Consequently, the stereoscopic display unit 122 continuously displays a cohesive view of the 3D model 140.

Common 3D Workspace

Figure 3:
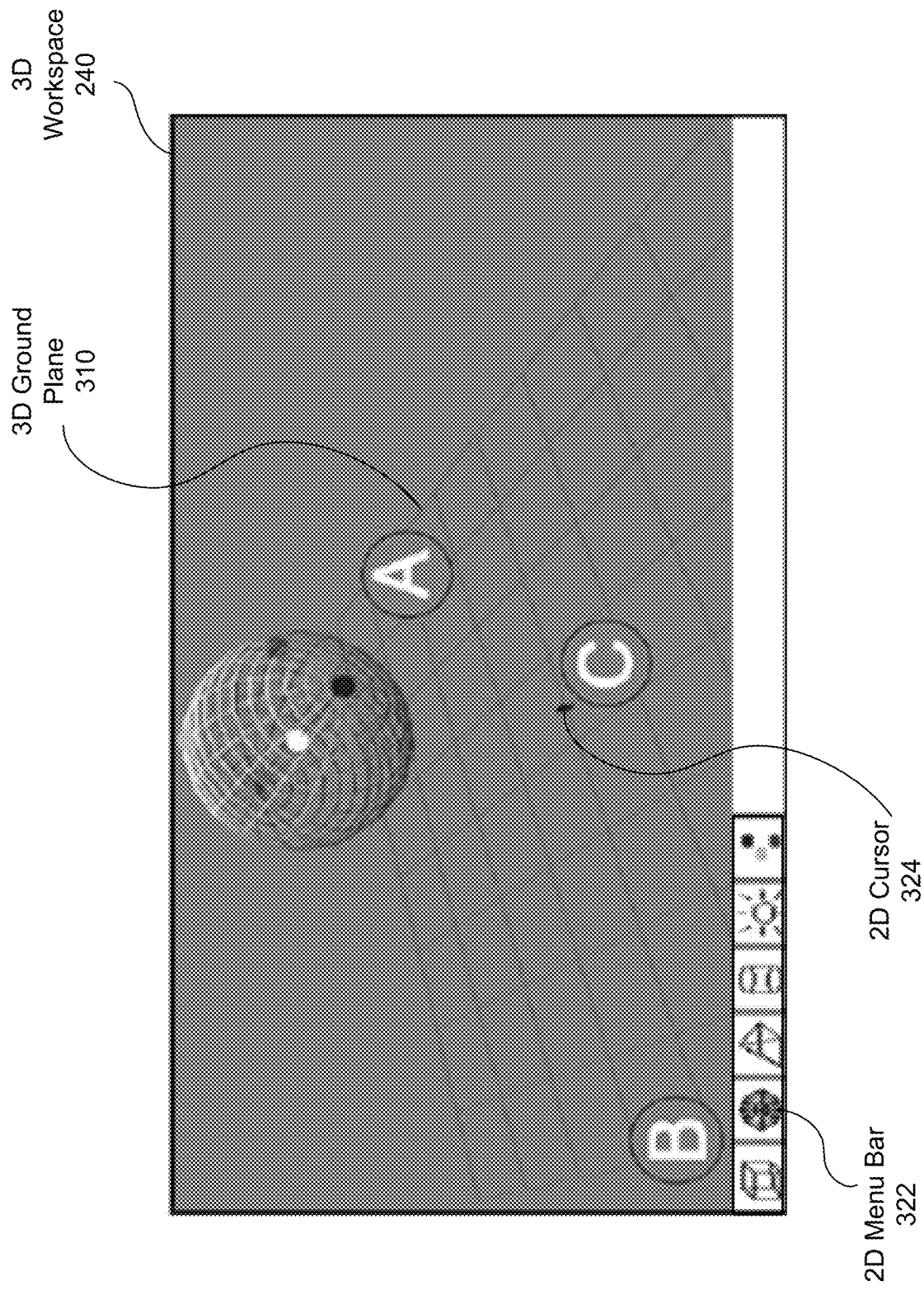
FIG. 3 is a conceptual diagram illustrating the three-dimensional (3D) workspace of FIG. 2, according to one embodiment of the present invention.

FIG. 3 is a conceptual diagram illustrating the three-dimensional (3D) workspace 240 of FIG. 2, according to one embodiment of the present invention. For explanatory purposes only, it is assumed that the mode 220 is 2D and that FIG. 3 depicts a screen capture of the stereoscopic display unit 122 that includes the 3D workspace 240, a 2D menu bar 322, and a 2D cursor 324.

The majority of user-interactions occur in the context of the 3D workspace 240. As shown, the 3D workspace 240 includes a 3D ground plane 310. The ground plane 310 provides a sense of global position and a framework for depth cues. The 2D menu bar 322 and the 2D cursor 324 facilitate user-interface interactions, including interactions with objects depicted in the 3D workspace 240. In alternate embodiments, the 3D workspace 240 may include any number of 2D user-interface elements in addition to or instead of the 2D menu bar 322 and/or the 2D cursor 324.

The 2D cursor 324 is controlled by the 2D user input devices 112 (e.g., mouse) and enables selection operations on objects included in the 3D model 140 and depicted in the 3D workspace 240. As part of processing a selection operation, the hybrid input/output subsystem 130 adds a translation widget to the image for both eyes 252. The translation widget behaves in a manner similar to translation widgets included in traditional desktop 3D modelling tools (i.e., enabling the user to position the selected objects).

Although not shown in FIG. 3, to select an object when the mode 220 is 3D, the user pinches their fingers in the free space in front of the 3D stereoscopic display device 122. The 3D input device 114 transmits the pinch to the hybrid input/output subsystem 130 and, in response, the hybrid input/output subsystem 130 adds a translation widget (for visual reference purposes) to both the image for left eye 254 and the image for right eye 256. Subsequently the user's hand motions in free space, transmitted via the 3D input device 114, control the location of the selected object.

The 2D menu bar 322 includes, from left to right, object icons, a lighting source icon, and a color icon. The object icons include a cube, sphere, pyramid, and cylinder that facilitate user-friendly object creation operations (i.e., adding objects to the 3D workspace 240 and, therefore, the 3D model 140). The lighting source icon enables positioning of a light source of the 3D model 140. More specifically, upon detecting selection of the lighting source icon (e.g., via the mouse), the hybrid input/output subsystem 130 adds a translation widget to the image for both eyes 252 that enables the user to position the selected lighting source. Similarly, upon detecting selection of the color icon, the hybrid input/output subsystem 130 adds a Hue Saturation Value (HSV) color widget that controls the color of the currently selected objects.

In general, the hybrid input/output subsystem 130 is configured to provide any number of 2D and 3D user-interface elements that enable efficient user interactions with the 3D model 140 as depicted in the 3D workspace 240. Further, the user-interface elements may be implemented in any technically feasible fashion.

Performing Hybrid Input and Output Operations

Figure 4:
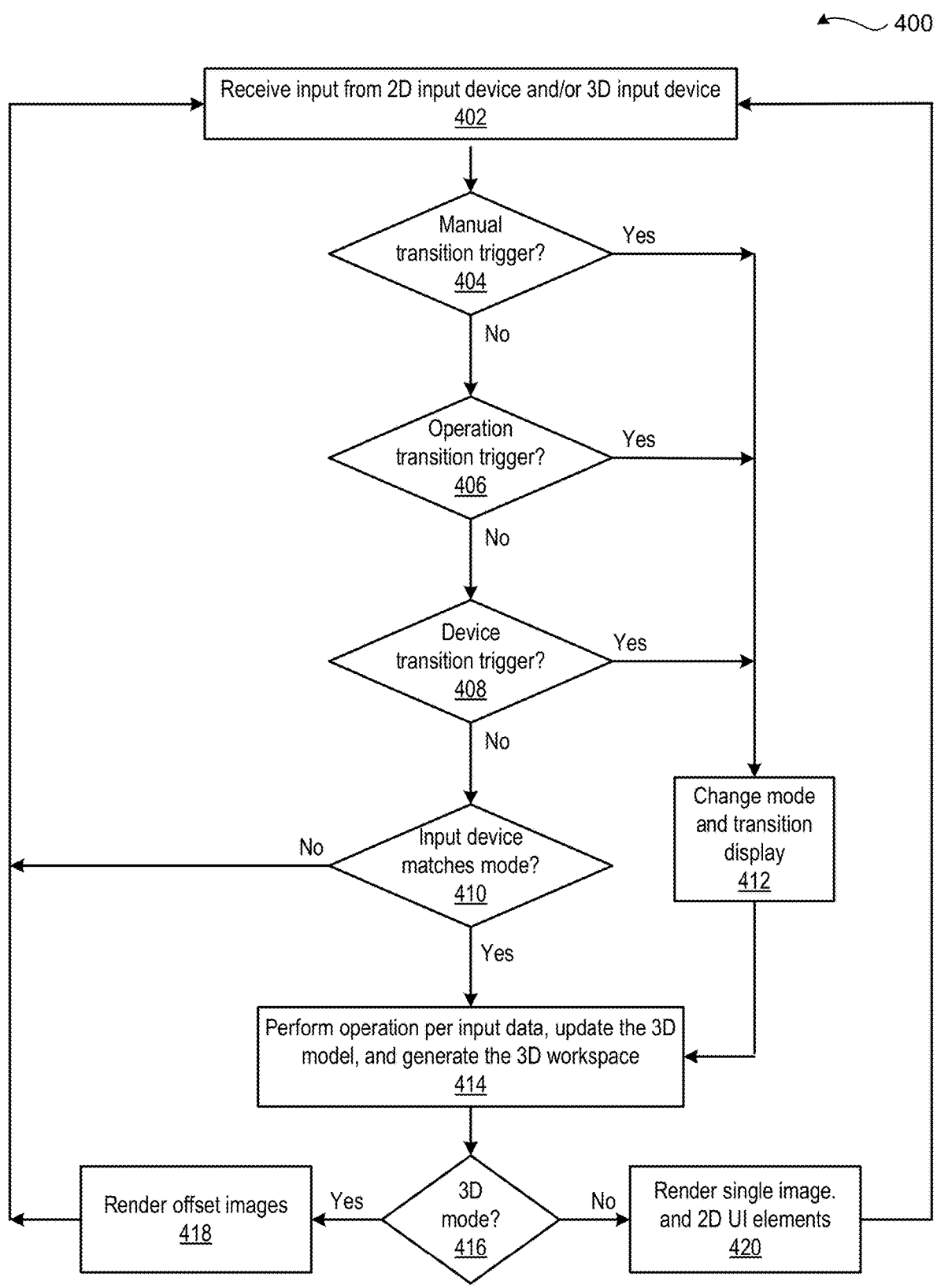
FIG. 4 is a flow diagram of method steps for integrating different forms of input with different forms of output in a three-dimensional modeling environment, according to one embodiment of the present invention.

FIG. 4 is a flow diagram of method steps for integrating different forms of input with different forms of output in a three-dimensional modeling environment, according to one embodiment of the present invention. Although the method steps are described with reference to the systems of FIGS. 1-3, persons skilled in the art will understand that any system configured to implement the method steps, in any order, falls within the scope of the present invention. For explanatory purposes only, it is assumed that the hybrid input/output subsystem 130 is operating on the 3D model 140.

As shown, a method 400 begins at step 402, where the hybrid input/output subsystem 130 receives input data from the 2D input devices 112 and/or the 3D input device 114. At step 404, the hybrid engine 230 compares the input data to one or more predetermined manual transition triggers. The predetermined manual transition triggers may be specified in any technically feasible fashion. For example, in some embodiments, the hybrid input/output subsystem 130 implements a keyboard shortcut that toggles between the mode 120 2D and the mode 120 3D. Advantageously, the manual transition triggers may be specified for the 2D input devices 112, the 3D input device 114, or any combination thereof. If, at step 404, the hybrid engine 230 determines that the input data matches a manual transition trigger, then the method 400 proceeds directly to step 412. If, at step 404, the hybrid engine 230 determines that the input data does not match any manual transition triggers, then the method 400 proceeds to step 406.

At step 406, the hybrid engine 230 compares the input data to a set of predetermined operation transition triggers. For instance, in some embodiments, the hybrid input/output subsystem 130 triggers a transition from the mode 220 of 2D to the mode 220 of 3D to improve the feedback during translation operations in the Z direction (into and out of the screen of the stereoscopic display device 122). If, at step 406, the hybrid engine 230 determines that the input data matches an operation transition trigger, then the method 400 proceeds directly to step 412. At step 406, if the hybrid engine 230 determines that the input data does not match any operation transition triggers, then the method 400 proceeds to step 408.

At step 408, the hybrid engine 230 compares the input data to a set of predetermined device transition triggers. The predetermined device transition triggers may be specified in any technically feasible fashion. For instance, in some embodiments, the hybrid input/output subsystem 130 provides a user-interface for defining device transition triggers. Notably, as part of step 406, the hybrid engine 230 evaluates input data from both the 2D input devices 112 and the 3D input device 114. If, at step 408, the hybrid engine 230 determines that the input data matches a device transition trigger, then the method 400 proceeds directly to step 412. At step 408, if the hybrid engine 230 determines that the input data does not match any device transition triggers, then the method 400 proceeds to step 410.

At step 410, the hybrid engine 230 evaluates the input data and determines whether the source of the input data (i.e., the 2D input devices 112 or the 3D input device 114) is consistent with the mode 220. If, at step 410, the hybrid engine 230 determines that the input device matches the mode 220 (i.e., the input data is from the 2D input device 112 and the mode 220 is 2D or, alternatively, the input data is from the 3D input device 114 and the mode 220 is 3D), then the hybrid engine 230 considers the input data to be relevant to the 3D model 140 in the current mode 220, and the method 400 proceeds directly to step 414. At step 410, if the hybrid engine 230 determines that the input device does not match the mode 220, then the hybrid engine 230 considers the input data to be irrelevant to the 3D model 140. The method 400 returns to step 402, where the hybrid engine 230 processes subsequent input.

At step 412, the hybrid engine 230 changes the mode 220 based on the input data and transmits the 3D work space 240 to the hybrid rendering unit 250. As part of step 412, the hybrid rendering unit 250 initiates a gradual transition to the mode 220. The hybrid rendering unit 250 may be configured to perform the transition in any technically feasible fashion, during any predetermined time period. During the transition to the mode 220, the hybrid rendering unit 250 replaces any number of UI elements that provide no advantage in the mode 220 with any number of UI elements designed to facilitate interactions in the mode 220. For example, during a transition from the mode 220 of 2D to the mode 220 of 3D, the hybrid rendering unit 250 generates a sequence of visual data that gradually fades the 2D menu bar 322 and the 2D cursor 324 from view.

At step 414, the hybrid engine 230 performs any number of operations based on the input data. To preserve the integrity of the 3D model 140 across the modes 220, the hybrid engine 230 updates the 3D model 140 to reflect the input data in a consistent manner regardless of the mode 220. As the hybrid engine 230 performs the operations, the hybrid engine 230 generates the 3D workspace 240 (visual information that represents the 3D model 140 and is shared between the modes 220) and transmits the 3D workspace 240 to the 3D rendering unit 250.

At step 416, the hybrid rendering unit 250 receives the 3D workspace 240 and determines whether the mode 220 is 2D or 3D. If the hybrid rendering unit 250 determines that the mode 220 is 2D, then the method 400 proceeds directly to step 420. At step 420, the hybrid rendering unit 250 renders the 3D workspace 240 and 2D UI elements to a single image. More specifically, the hybrid rendering unit 250 generates and transmits the image for both eyes 252 to the stereoscopic display device 122. The method 400 then returns to step 404, where the hybrid engine 230 processes subsequent input.

If, at step 416, the hybrid rendering unit 250 determines that the mode 220 is 3D, then the method 400 proceeds to step 418. At step 418, the hybrid rendering unit 250 renders the 3D workspace to two offset images. More specifically, the hybrid rendering unit 250 generates and transmits the image for the left eye 254 and the image for the right eye 256 to the stereoscopic display device 122. The method 400 then returns to step 404, where the hybrid engine 230 processes subsequent input.

The hybrid input/output subsystem 130 is configured to repeat method 400, continuously evaluating input data from both the 2D input devices 112 and the 3D input device 114 and transmitting either non-stereoscopic data or stereoscopic data to the stereoscopic display device 122. In this manner, the hybrid input/output subsystem 130 presents a unified interface to the 3D model 140 that optimizes the input and output based on the user interactions.

In sum, the disclosed techniques may be used to efficiently optimize the input and output interfaces during the 3D modelling process. Notably, a hybrid input/output subsystem receives data via a 2D input device (e.g., a mouse) and a 3D input device (e.g. a hand motion tracking system) and renders images of a 3D object to a stereoscopic-capable display device. In a 2D mode, the hybrid input/output subsystem processes the data received via the 2D input device, performs associated operations on a 3D model of the 3D object, and renders a single, non-stereoscopic image to a 3D workspace. By contrast, in a 3D mode, the hybrid input/output subsystem processes the data received via the 3D input device, performs associated operations on the 3D model, and renders two offset images to the 3D workspace, enabling stereoscopic viewing.

The hybrid input/output subsystem transitions between the non-stereoscopic and stereoscopic mode based on a variety of manual triggers and automatic triggers, such as operation type, that facilitate selection of the most efficient input and output modes for the current task. Irrespective of the selected mode, the hybrid input/output subsystem operates on a single 3D model and renders to a single 3D workspace—enabling hybrid input and output interactions with an integrated 3D model design environment.

Advantageously, selecting the optimal input and output interfaces for a given task significantly increases productivity without needlessly fatiguing the user. Because the hybrid input/output subsystem automatic switches modes based on detected input device motion and current operation type, the mixed modality is user-friendly and the associated viewing experience in non-disruptive. Further, since the hybrid input/output subsystem provides manual triggers, adverse physical effects potentially associated with extended stereoscopic viewing may be alleviated by interjecting periods of non-stereoscopic viewing.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for interacting with a three-dimensional model, the method comprising:
    receiving a first user input that operates on the three-dimensional model to determine that a current operational mode should switch to a non-stereoscopic mode;
    in response to receiving the first user input, generating first shared eye image data that represents the three-dimensional model;
    receiving a second user input that directly interacts with the three-dimensional model via a first type of interaction with the three-dimensional model;
    determining that the first type of interaction with the three-dimensional model comprises rotating at least a portion of the three-dimensional model;
    determining that the current operational mode should switch to a stereoscopic mode in response to determining that the first type of interaction with the three-dimensional model comprises rotating the at least the portion of the three-dimensional model;
    in response to determining that the current operational mode should switch to the stereoscopic mode, generating first left eye image data and first right eye image data that represent the three-dimensional model;
    determining that the first type of interaction with the three-dimensional model that comprises rotating the at least the portion of the three-dimensional model has finished; and
    in response to determining that the first type of interaction that comprises rotating the at least the portion of the three-dimensional model has finished, switching the current operational mode to the non-stereoscopic mode.

2. The method of claim 1, wherein the second user input is associated with three-dimensional spatial data, and the first user input is associated with two-dimensional data.

3. The method of claim 1, wherein the second user input is associated with two-dimensional input data, and further comprising determining that the two-dimensional input data matches a predefined trigger.

4. The method of claim 1, wherein the second user input is associated with sensory data that indicates location of a three-dimensional input device, and further comprising determining that a value included in the sensory data exceeds a predetermined threshold.

5. The method of claim 1, wherein the second user input specifies an operation, and further comprising determining that the operation matches a predetermined operation trigger.

6. The method of claim 5, wherein the predetermined operation trigger is a rotation operation.

7. The method of claim 1, wherein the first shared eye image data further represents a two-dimensional menu bar and a cursor.

8. The method of claim 1, further comprising generating a first transition data and a last transition data prior to generating the first left eye image data and the first right eye image data, wherein the first transition data includes second shared image data and the last transition data includes second left eye image data and second right eye image data.

9. The method of claim 8, wherein the first transition data represents a two-dimensional menu bar and a cursor superimposed on the three-dimensional model, and the last transition data represents the three-dimensional model and not the two-dimensional menu bar and the cursor.

10. One or more non-transitory computer-readable storage media including instructions that, when executed by one or more processors, cause the one or more processors to interact with a three-dimensional model by performing the steps of:
    receiving a first user input that operates on the three-dimensional model to determine that a current operational mode should switch to a non-stereoscopic mode;
    in response to receiving the first user input, generating first shared eye image data that represents the three-dimensional model;
    receiving a second user input that directly interacts with the three-dimensional model via a first type of interaction with the three-dimensional model;
    determining that the first type of interaction with the three-dimensional model comprises rotating at least a portion of the three-dimensional model;
    determining that the current operational mode should switch to a stereoscopic mode in response to determining that the first type of interaction with the three-dimensional model comprises rotating the at least the portion of the three-dimensional model;
    in response to determining that the current operational mode should switch to the stereoscopic mode, generating first left eye image data and first right eye image data that represent the three-dimensional model;
    determining that the first type of interaction with the three-dimensional model that comprises rotating the at least the portion of the three-dimensional model has finished; and
    in response to determining that the first type of interaction that comprises rotating the at least the portion of the three-dimensional model has finished, switching the current operational mode to the non-stereoscopic mode.

11. The one or more non-transitory computer-readable storage media of claim 10, wherein the second user input is associated with three-dimensional spatial data, and the first user input is associated with two-dimensional data.

12. The one or more non-transitory computer-readable storage media of claim 10, wherein the second user input is associated with two-dimensional data, and further comprising determining that the two-dimensional data matches a predefined trigger.

13. The one or more non-transitory computer-readable storage media of claim 10, wherein the second user input is associated with sensory data that indicates location of a three-dimensional input device, and further comprising determining that a value included in the sensory data exceeds a predetermined threshold.

14. The one or more non-transitory computer-readable storage media of claim 10, wherein the second user input specifies an operation, and further comprising determining that the operation matches a predetermined operation trigger.

15. The one or more non-transitory computer-readable storage media of claim 14, wherein the predetermined operation trigger is a rotation operation.

16. The one or more non-transitory computer-readable storage media of claim 10, wherein the first shared eye image data further represents a two-dimensional menu bar and a cursor.

17. The one or more non-transitory computer-readable storage media of claim 10, further comprising generating a first transition data and a last transition data prior to generating the first left eye image data and the first right eye image data, wherein the first transition data represents a two-dimensional menu bar and a cursor superimposed on the three-dimensional model, and the last transition data represents the three-dimensional model and not the two-dimensional menu bar and the cursor.

18. A system configured to interact with a three-dimensional model, the system comprising:
   a first memory that includes the three-dimensional model; and
   one or more processors configured to:
      receive a first user input that operates on the three-dimensional model to determine that a current operational mode should switch to a non-stereoscopic mode;
      in response to receiving the first user input, generate first shared eye image data that represents the three-dimensional model;
      receive a second user input that directly interacts with the three-dimensional model via a first type of interaction with the three-dimensional model;
      determine that the first type of interaction with the three-dimensional model comprises rotating at least a portion of the three-dimensional model;
      determine that the current operational mode should switch to a stereoscopic mode in response to determining that the first type of interaction with the three-dimensional model comprises rotating the at least the portion of the three-dimensional model;
      in response to determining that the current operational mode should switch to the stereoscopic mode, generate first left eye image data and first right eye image data that represent the three-dimensional model;
      determine that the first type of interaction with the three-dimensional model that comprises rotating the at least the portion of the three-dimensional model has finished; and
      in response to determining that the first type of interaction that comprises rotate the at least the portion of the three-dimensional model has finished, switching the current operational mode to the non-stereoscopic mode.

19. The system of claim 18, wherein the second user input is associated with three-dimensional spatial data, and the first user input is associated with two-dimensional data.

* * * * *